United States Patent Office 3,642,907
Patented Feb. 15, 1972

3,642,907
ACETONYLACETONE AND PARA-CRESOL BY OXIDATION OF METHACROLEIN DIMER
Thomas A. Schenach, Dana Point, and David L. Trimble, Westminster, Calif., assignors to Atlantic Richfield Company, Philadelphia, Pa.
No Drawing. Filed Oct. 1, 1968, Ser. No. 764,295
Int. Cl. C07c *49/12, 39/06*
U.S. Cl. 260—593 R    4 Claims

ABSTRACT OF THE DISCLOSURE

A process comprising the catalytic air oxidation of methacrolein dimer (3,4-dihydro-2,5-dimethyl-2H-pyran-2-carboxaldehyde) to produce acetonylacetone (2,5-hexanedione) and p-cresol is disclosed. Conventional transition metal oxidation catalysts are used.

BACKGROUND OF THE INVENTION

Field of the invention

This invention relates to organic synthesis and, more particularly, to the synthesis of acetonylacetone and p-cresol. Still more specifically, this invention relates to a process for oxidizing methacrolein dimer to produce these useful products.

Description of the prior art

Methacrolein and its dimer are well known. Methacrolein dimer usually constitutes a substantial impurity in technical methacrolein. It is produced by the thermal dimerization of methacrolein. This dimerization occurs at from about 100 to 200° C. in an inert atmosphere. The methacrolein dimer can be produced in high yields using inhibitors to prevent polymerization.

Methacrolein is available by known synthesis methods from isobutylene which has recently become available in substantial commercial quantities.

Acetonylaldehyde is a well known and useful chemical. Acetonylacetone is useful, for example, as a metal chelating agent and finds application in metal recovery operations. Acetonylacetone is also known to be useful as a tanning agent, a solvent for paints, thinners, lacquers, etc., and, following reduction to the 2,5-hexanediol, as an intermediate in the production of valuable polyester resins.

Acetic acid and formic acid are well known useful articles of commerce.

P-cresol is commercially used as a disinfectant, fumigating composition and as an intermediate in the production of dyestuffs and other organic chemicals. P-cresol, free of isomers, is about 3 times as valuable as mixtures of p-, m- and o-cresols.

Crotonaldehyde dimer, 2,6-dimethyl-5,6-dihydro-2H-pyran-3-carbonaldehyde, when oxidized in the presence of manganese acetate at 125° C. in the presence of t-butyl alcohol is known to produce the corresponding carboxylic acid, along with acetic acid, according to the following equation:

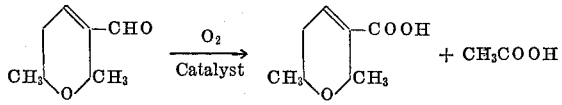

Similar results have been observed using cobalt-nickel acetate catalyst at 60° C. In addition to the above identified products, a tar-like polymeric material was also produced but acetonylacetone was not found in the reaction mixture and p-cresole could not be produced by hydrolysis of the reaction mixture.

It has now been discovered that the catalytic oxidation of methacrolein dimer comprises a method for producing acetonylacetone and by additional hydrolysis, p-cresol free of m-cresol and o-cresol. It is, accordingly, a primary object of this invention to provide a process for the catalytic oxidation of methacrolein dimer to produce useful chemical intermediates and end products.

SUMMARY OF THE INVENTION

Methacrolein dimer, 3,4 - dihydro - 2,5 - dimethyl-2H-pyran-2-carboxaldehyde, is oxidized by air or other oxygen-containing gas at elevated temperatures in the presence of a transition metal oxidation catalyst to produce acetonylacetone. In addition, hydrolysis of the side products with dilute mineral acid produces p-cresole, free of other cresol isomers. The production of both of these compounds was unpredictable and is quite unexpected. Acetic acid and formic acid are also produced.

The generalized reaction of this invention is believed to be as follows:

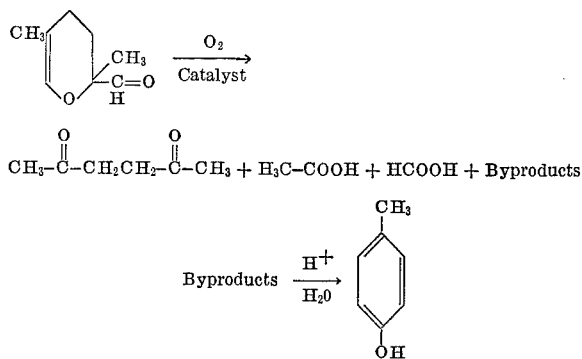

The principal object of this invention is to provide a method for oxidizing methacrolein dimer to produce useful compounds.

A more specific object of this invention is to provide a novel process for producing acetonylacetone.

A further and more specific object of the invention is to provide a novel process for producing p-cresol, free of the ortho- and meta-isomers.

More specifically, the object of this invention is to provide a method for catalytic oxidation of methacrolein dimer to produce acetonylacetone, p-cresol, acetic acid and formic acid.

A process comprising the catalytic air oxidation of methacrolein dimers constitutes an additional object of this invention.

The process variables and conditions described hereinafter constitute additional and non-limiting specific objects of the invention.

Other objects of the invention will become apparent from the specification which follows.

DESCRIPTION OF THE PREFERRED EMBODIMENTS

The project from which this invention developed was aimed at producing methacrylic acid from methacrloein dimer. Methacrolein dimer was available in large quantities from the oxidation of isobutylene to methacrolein. The methacrolein dimer was normally present as an impurity in the methacrolein but, by minor modification in the methacrolein production process or by subsequent treatment, the dimer could be produced in very high yields. The purpose of the project, initially, was to find economically favorable ways to utilize the methacrolein dimer. It was, therefore, postulated that by preoxidation of the methacrolein dimer to form the corresponding carboxylic acid followed by cleavage of the cyclic dimer structure one molecule of methacrylic acid and one molecule of methacrolein could be produced. The methacrolein, it was postulated, could be recycled for producing an additional molecule of methacrylic acid.

The emphasis in the project, therefore, was directed at finding an economically favorable process for oxidizing and cleaving the methacrolein dimer. In the course of experiments on the oxidation and cleavage reactions, several experimental liquid phase air-oxidation reactions were conducted on the methacrolein dimer. Subsequently, transition metal oxidation catalysts were used to improve the oxidation. Quite unexpectedly, the products of the oxidation did not include methacrylic acid but, equally surprisingly, the major product of the oxidation reaction was acetonylacetone. Subsequently, when t-butanol was used as solvent, lesser yields of para-cresol were formed by hydrolysis of yet unidentified byproducts. The mechanism for the formation of these compounds is not fully understood. Both acetic and formic acids are also produced.

The process of this invention is carried out, preferably, in a pressure vessel or a magnetically stirred autoclave reaction vessel. Special vessels are not essential for the reaction but have been found the most convenient. The reaction may be carried out at from 1 atmosphere, or less, pressure to at least as high as 600 p.s.i.g. Higher pressures can probably be used, however, since no significant pressure effect has been determined. Pressures from about 100 p.s.i.g. to about 600 p.s.i.g. are conveniently used.

The temperature of the reaction may be maintained, from about 40° C. to about 175° C. Below 40° C. the reaction proceeds too slowly to be economically feasible and above 175° C. undue amounts of polymeric material are formed. The preferred reaction temperature range is from about 80° C. to about 125° C., although a precise optimum temperature has not yet been determined.

The reaction time is preferably from about 4 hours to about 8 hours, although reaction times from about 1 hour to about 24 hours or more may be used. Low yields result from too short reaction times and undue polymeric formation results from unduly prolonged reaction times.

The reaction is normally carried out in the presence of oxygen; however, air or any molecular oxygen-containing gas may be used. In some instances, it may be desirable to use mixtures of oxygen with an inert gas to provide desired reaction conditions or to control the rate of reaction. Mixtures of oxygen and nitrogen, for example, may thus be used.

Mixtures of oxygen with carbon dioxide, or other gases may be desirable in certain instances.

Transition metal oxidation catalysts generally are useful for the inventive process. Copper and silver from Group I-B, vanadium from Group V-B, chromium, molybdenum and tungsten from Group VI-B, manganese from Group VII-B and iron, cobalt, nickel, ruthenium, palladium and platinum from Group VIII-B are useful in the process. Cobalt and nickel are the preferred catalysts. The catalyst may be present as the free metal, a salt of the metal, or the metal or a salt supported on a catalyst carrier such as alumina, silica gel, charcoal, kieselguhr, etc. On the laboratory scale, the metal salts are preferred; however, it is anticipated that on a commercial scale supported metal catalysts will be most advantageous. The metal salts may be the metal halogens, acetates, etc., or even metal complexes such as the metal acetonylacetate.

The process is carried out in the liquid phase by heating and intermixing the liqud phase, the catalyst and the oxidant, oxygen, with or without a solvent. T-butyl alcohol as a solvent is, however, required for the production of p-cresol.

Reaction conditions are illustrated by the following non-limitative examples of the inventive process.

EXAMPLE 1

Methacrolein dimer, 14.4 gms., t-butyl alcohol as a solvent, 71.4 gms., and 0.5 gm. of chromium acetate catalyst, along with 5.8 gms. of benzene as a gas chromatographic standard were introduced into a Magne-Drive stirred autoclave. The autoclave was pressured to 500 p.s.i.g. with oxygen and heated initially to 40° C. and subsequently to 80° C. The reaction proceeded smoothly at 80° C. for about 1 hour.

Acetonylacetone in 20% yield could be separated from the reaction product mixture by simple distillation.

The para-cresol was isolated from the reaction mixture as follows: the bulk of the t-butyl alcohol solvent was distilled from the reaction mixture. The remaining mixture was then refluxed with 3 normal HCl and extracted with benzene. Para-cresol was detected and identified in the extract by means of thin layer chromatography and infrared spectrophotometry. Ortho- and metal-cresol were determined, by these analytical techniques, to be absent.

2,5-hexanedione (acetonylacetone) was the major component in the reaction product, however. This compound was identified and analyzed by infrared spectra, mass spectography, gas chromatography and by its physical properties, boiling point, refractive index, etc.

The reaction mechanism for producing p-cresol is not known but it is believed that some derivative of this compound is produced during the oxidation reaction and that the mineral acid reflux liberates the free phenol. HCl was used in most experiments for convenience purposes but any mineral acid, normally having a concentration of about 1 to about 3 normal, is equivalent.

EXAMPLE 2

In a second experiment, 15 mls. of the methacrolein dimer, 80 mls. of t-butyl alcohol, 5 mls. of benzene, and 0.1 gm. of cobalt acetate and 0.1 gm. of nickel acetate as catalysts were introduced into the reaction vessel. The reaction vessel was pressurized with oxygen to about 600 p.s.i.g. and the mixture was heated to about 60° C. The reaction time was above 3 hours. After concentration of the reaction mixture and hydrolysis with dilute hydrochloric acid, thin-layer chromatography indicated the presence of about 7 percent p-cresol along with the major component, acetonylacetone.

It was found, however, that using benzene alone as a solvent p-cresol was not formed. The function of the t-butanol in the formation of the para-cresol is not understood. This phenomena is illustrated by the following experiment:

EXAMPLE 3

14.6 gms. of the methacrolein dimer, 74.6 gms. of benzene and 0.1 gm. of cobalt bromide catalyst were introduced into the reaction vessel. The oxygen pressure was increased to about 200 p.s.i.g. and the temperature was increased to about 50° C. A reaction time of about 20 hours was used.

Acetonylacetone was present in significant yield but no p-cresol was found, even after hydrolysis with dilute HCl. Whether the lack of p-cresol is attributable to the difference in solvent or other reaction conditions has not been determined conclusively but no p-cresol has been found in any reaction using only benzene as a solvent.

The reaction may also be carried out in the absence of a solvent.

EXAMPLE 4

85.8 gms. of methacrolein dimer diluted with 5.0 gm. of benzene was oxidized in the presence of 0.3 gm. of nickel acetate and 0.3 gm. of cobalt acetate under 600 p.s.i.g. oxygen at 65 to 85° C. for a reaction time of about 26 hours.

Approximately 20 gms. of acetonylacetate were produced but p-cresol was not identifiable as a product.

Exemplary data are shown in Table I which follows.

TABLE I.—OXIDATION OF METHACROLEIN DIMER

| | Example 3 | Example 5 | Example 6 |
|---|---|---|---|
| Solvent | None | t-Butanol | Benzene. |
| Temperature (° C.) | 60 | 125 | 80. |
| Catalysts | $Co(C_2H_3)_2 \cdot 4 H_2O$ (0.3%) and $Na(C_2H_3O_2)_2 \cdot 4 H_2O$ (0.3%). | $CoBr_2$ (0.1%) and $NiCl_2$ (0.1%). | $Co(C_2H_3O_2)_2 \cdot 4 H_2O$ (0.1%) and $Ni(C_2H_3O_2)_2 \cdot 4 H_2O$ (0.1%). |
| Dimer charged | 85.8 g. (0.61 moles) | 30 g. (0.21 moles) | 13.2 g. (0.094 moles). |
| Dimer recovered | None | None | None. |
| Products: | | | |
|   Acetonylacetone | 20 g. (0.18 moles) | 5.5 g. (0.048 moles) | 2.5 g. (0.022 moles). |
|   Acids | | | approx. 1.5 g. |
|     Acetic | 5.5 g. (0.09 moles) | 3 g. (0.05 moles) | |
|     Formic | 4 g. (0.09 moles) | 1.4 g. (0.03 moles) | |
|   Other unidentified byproducts | None | 0.5 g | None. |
|   Bottoms | Approx. 60 g | Approx. 20 g | Approx. 6 g. |

As is apparent from the foregoing discussion, the novel process of this invention produces quite unexpected results and constitutes a novel and unpredictable method for preparing commercially valuable compounds, acetonylacetone and para-cresol, as well as acetic and formic acids.

Variations from the reaction conditions set forth, which have not been fully optimized, may be made based upon the teachings of this invention without departing from the spirit and scope of the invention as defined in the following claims.

We claim:

1. The process comprising oxidizing methacrolein dimer with a molecular oxygen-containing gas at temperatures of from about 40° to about 175° C. in the presence of a catalyst selected from the group consisting of vanadium, chromium, molybdenum, tungsten, manganese, iron, ruthenium, cobalt, nickel, palladium, platinum, copper, silver, halogens thereof, acetates thereof, acetonyl acetates thereof and mixtures thereof.

2. The process of claim 1 wherein the temperature is from about 80° to about 125° C.

3. The novel process for producing acetonylacetone and para-cresol comprising catalytically reacting oxygen with metacrolein dimer at temperatures of from about 40° to 175° C. in the presence of t-butanol as a solvent and a catalyst selected from the group of metals and salts of metals selected from the group consisting of vanadium, chromium, molybdenum, tungsten, manganese, iron, ruthenium, cobalt, nickel, palladium, platinum, copper, and silver, and hydrolyzing the reaction mixture with dilute mineral acid to liberate the para-cresol.

4. The process of claim 3 wherein the reaction is carried out at a temperature of from about 80 to about 125° C.

References Cited

UNITED STATES PATENTS 2,636,898   4/1953   Buckley _____ 260—593
2,624,764   1/1953   Emerson et al. _____ 260—593

DANIEL D. HORWITZ, Primary Examiner

U.S. Cl. X.R.

260—345.7, 541, 542; 252—431, 441, 444, 454, 456, 458, 459, 460, 464, 465, 466, 467